March 24, 1953
E. C. HORTON
2,632,471
VALVE DEVICE FOR JOINT CONTROL OF
WINDSHIELD CLEANERS AND WASHERS
Filed May 4, 1949
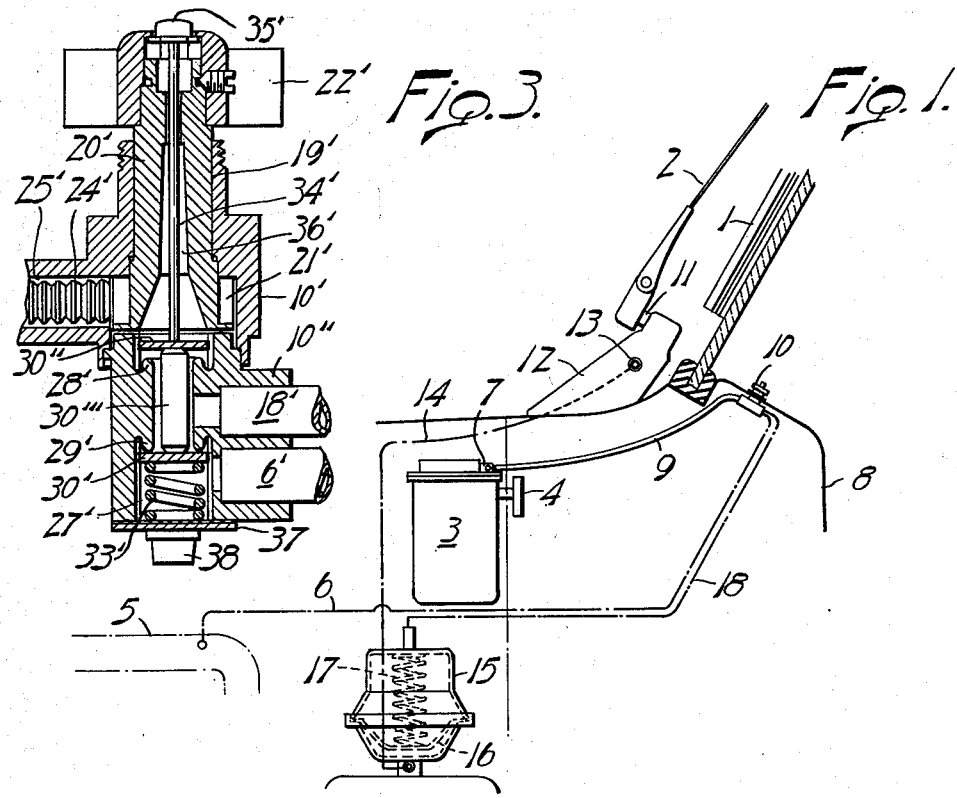
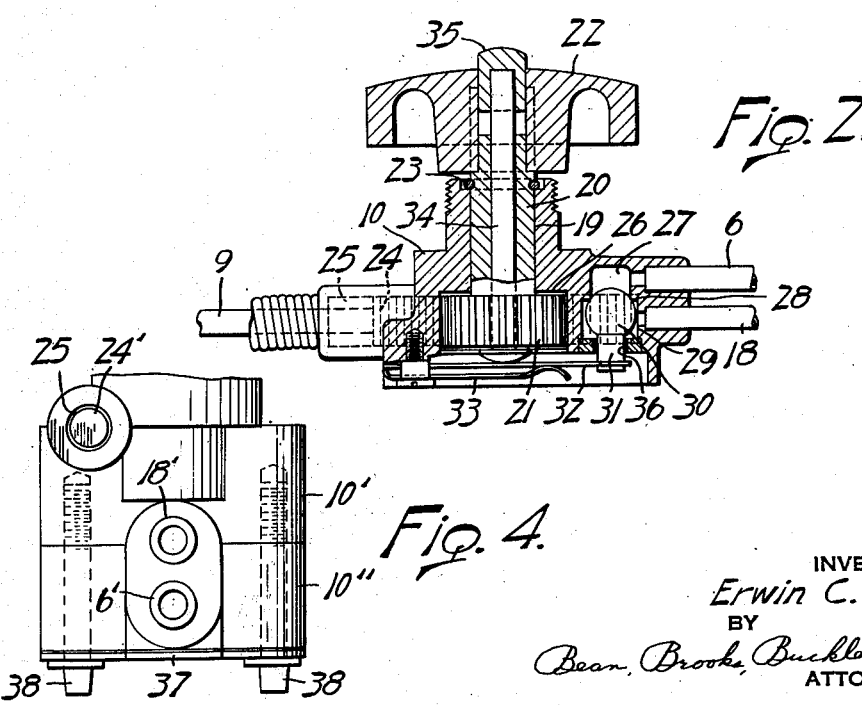
INVENTOR
*Erwin C. Horton*
BY
*Bean, Brooks, Buckley & Bean*
ATTORNEYS Patented Mar. 24, 1953

2,632,471

UNITED STATES PATENT OFFICE 2,632,471

VALVE DEVICE FOR JOINT CONTROL OF WINDSHIELD CLEANERS AND WASHERS

Erwin C. Horton, Hamburg, N. Y., assignor to Trico Products Corporation, Buffalo, N. Y.

Application May 4, 1949, Serial No. 91,321

4 Claims. (Cl. 137—622)

This invention relates to the windshield cleaning art and has particular reference to the simplification of the control for the windshield cleaning apparatus.

Many of the modern automobiles are equipped with windshield washers in addition to the usual windshield cleaner, the latter embodying an oscillatory wiper movable over a definite path on the windshield surface, and the washer embodying a spray which is directed onto the surface in the path of the wiper. Where the controls are distinct, it is necessary to operate one and then reach over and actuate the other, usually at a distance therefrom and also with a certain amount of distraction from the safe operation of the vehicle.

The primary object of the present invention is to simplify the controls by bringing them together in such a manner that the windshield cleaner, as well as the washer, may be operated from a single point and with a minimum distraction from the maneuvering of the vehicle.

The invention further has for its object to provide a simplified control in which the two mechanisms may be independently operated either jointly or independently one of the other, for initiating the operation of either mechanism ahead of the other or conjointly therewith.

The foregoing and other objects will manifest themselves as the following description progresses, reference being had to the accompanying drawing, wherein Fig. 1 is a diagrammatic lay-out depicting the present invention as applied to a motor vehicle;

Fig. 2 is a detailed sectional view through the control;

Fig. 3 is a similar view through a modified construction; and

Fig. 4 is a side elevation of the modification.

Referring more particularly to the drawing, the numeral 1 designates the windshield wiper, 2 its actuating arm, and 3 the windshield cleaner motor which is operatively connected to the wiping arm through suitable transmission, indicated generally at 4. In the illustrated embodiment the motor 3 is suction operated, being connected to the intake manifold 5 of the vehicle engine by a conduit 6, with which communication is established by means of a control valve 7 on the motor and accessible from a remote point such as the instrument panel by means of a flexible push-pull wire or cable 9 leading to a control generally indicated by the numeral 10. The wiper arm 2 is fixed on a shaft 11 journaled in a cowl mounted housing 12, and on this housing is fixed a suitable spray nozzle 13 connected by a conduit 14 to a suction actuated liquid pump 15, which latter has a fluid displacing member 16 actuated on its delivery stroke by a spring 17. The spring chamber of the pump is connectible to the intake manifold or suction line 6 by the control 10 and a suction communication 18.

The control 10 embodies a casting having a journal bearing 19 for a tubular shaft 20, which latter has a pinion 21 fixed on one end and a manipulating knob 22 fixed on the opposite end, the shaft being retained in its bearing by means of a ring 23. The pinion meshes with a rack 24 slidably mounted in a guideway 25 and fixedly secured to the adjacent end of the push-pull wire 9 that leads to the control valve of the windshield cleaner motor. Therefore, by simply turning the knob 22 in one direction or the other, the valve wire 9 will be pushed or pulled accordingly to open or close the valve 7. The pinion is housed within a chamber 26 in the casting or body 10 of the control. A valve chamber 27 is also formed in this casting and has opposed seats 28 and 29 selectively engageable by valve 30. The chamber 27 at one side of the seats is in open communication with the intake manifold through the suction line 6, while the conduit or passage 18 opens from the washer motor 15 into the chamber 27 between the two seats. The valve 30 has a depending shank 31 connected to a valve supporting link 32, which latter is urged by a flat spring 33 to normally engage the seat 28 and thereby close off the suction passage 6. By depressing the link 32 against the urge of the spring 33, the valve is shifted from the seat 28 to the seat 29 to thereby open the suction source to the washer motor to initiate operation of the latter. For depressing the link 32, a rod 34 is slidable within the tubular shaft 20 and rests at its lower end upon the link 32, while its opposite end carries a knob or button 35 which projects above the surface of the turnable knob 22. Depressing the button 35 against the action of the spring 33 will therefore accomplish the valve shifting movement for operating the washer. Release of the button 35 will enable the flat spring 33 to return the rod 34 to its upper position.

Fig. 3 depicts a modification of the control, and as illustrated therein the body is made in two parts 10' and 10'' with the part 10' being provided with a shaft bearing 19' to receive the turnable tubular shaft 20' which carries at its inner end the pinion 21' and at its outer end the actuating knob 22'. With the pinion 21' meshing with the rack 24' which has sliding support in the guideway 25', a turn of the knob 22' clockwise or counterclockwise will accordingly shift the push-pull wire 9 and open or close the valve 7 of the windshield cleaner motor 3.

A complemental casing section 10'' is provided with oppositely facing seats 28' and 29' arranged at one side of the chamber 27' into which latter the suction line 6' opens. Instead of the spherical shaped valve 30, a composite valve is shown embodying spaced discs 30' and 30'' with an intermediate connecting spacer 30'''. A coil spring 33' arranged in the chamber 27' serves to hold the valve 30' directly seated, and through the spacer 30''' the companion valve disc 30'' unseated. The valve actuating rod 34' is slidably mounted in the tubular shaft 20' and provided with an actuating knob or button 35' by which the valve structure 30', 30'' and 30''' may be depressed against the tension or action of the spring 33' to seat the valve disc 30'' and unseat the valve disc 30'. Release of the button 35' will permit the spring 33' to reseat the disc 30' and unseat the disc 30'', in which latter position the conduit 18' from the washer motor will be vented to the atmosphere through the clearance 36' in a like manner to the construction disclosed in Fig. 2, wherein the conduit 18 is normally vented to the atmosphere through the clearance 36 about the valve shank 31.

The spring chamber 27' is sealed shut by a plate or gasket 37, while the body section 10'' is united with the cap section 10' by suitable fasteners 38 such as long screws which pass through the plate 37 as well as the casting 10''.

The control is readily manipulated to actuate either the windshield cleaner or the washer, the button 35, (35') being depressible while the turnable knob is being rotated. By reason of this arrangement both controls are readily accessible to the motorist, and either is capable of being actuated independently of the other if need be.

The foregoing description has been given in detail without thought of limitation since the inventive principles involved are capable of assuming other physical embodiments without departing from the spirit of the invention and the scope of the appended claims.

What is claimed is:

1. A joint control for the fluid motors of a windshield cleaner and a windshield washer, comprising a body having a journal bearing, a tubular shaft journaled in the bearing and having a knob on one end formed with a recess opening into the hollow of the shaft, means turnable with the shaft for controlling one motor, said body having a separable section with a valve seat opposing the bore of the shaft, said section having an oppositely facing seat with a passage entering between the two seats from the companion motor, a valve structure having spaced members cooperating with the seats and a spacer between the members and acting to close the port through one seat while opening the other, a spring arranged in a chamber in said section and resiliently holding the valve members so positioned, a plate closing the spring chamber, an actuating rod slidable in the tubular shaft to reverse the positions of the valves and having an enlarged button depressible in the knob recess, and means securing the plate operative and the section to the body for holding the spring in a position normally to elevate the actuating rod.

2. A joint control for the fluid motors of a windshield cleaner and a windshield washer, comprising a body having a journal bearing, a tubular shaft journaled in the bearing, a knob fixed on one end of the shaft and through which the bore of the shaft opens, means turnable with the shaft for controlling one motor, said body having a separable section with a valve seat opposing the bore of the shaft, said section having an oppositely facing seat with a passage entering between the two seats from the companion motor, a valve structure having spaced members cooperating with the seats and a spacer between the members and acting to close the port through one seat while opening the other, a spring arranged in a chamber in said section and resiliently holding the valve members so positioned, and an actuating rod slidable in the tubular shaft to depress the valve structure against the spring, said spring normally holding the actuating rod projected from the knob for access.

3. A joint control for the fluid motors of a windshield cleaner and a windshield washer, comprising a body having a journal bearing, a tubular shaft journaled in the bearing, a knob fixed on one end of the shaft and through which the bore of the shaft opens, means turnable with the shaft for controlling one motor, a valve in the body for controlling the operation of the companion motor, and a spring retracted actuating rod slidable in the tubular shaft for actuating the valve, said spring normally holding the actuating rod projected from the knob for access.

4. A joint control for the fluid motors of a windshield cleaner and a windshield washer, comprising a body having a journal bearing, a tubular shaft journaled in the bearing, a knob fixed on one end of the shaft and through which the bore of the shaft opens, a pinion on the other end of the shaft, a push-pull wire having a rack in mesh with the pinion for controlling one motor, a valve in the body for controlling the operation of the companion motor, said valve comprising spaced valve seats with means normally engaging one seat and adapted to engage the companion seat, a fluid passage from said companion motor opening into the space between said seats and being normally vented through said companion seat to the atmosphere, a pressure supply line normally closed by said valve means and connectible to the companion motor by reversing the valve means, spring means normally holding the valve means in its normal position, and a valve actuating rod slidable in the tubular shaft and having a button protruding through the knob.

ERWIN C. HORTON.

REFERENCES CITED

The following references are of record in the file of this patent:

UNITED STATES PATENTS

| Number | Name | Date |
|---|---|---|
| 1,914,133 | Kerr | June 13, 1933 |
| 1,937,246 | Reedy | Nov. 28, 1933 |
| 2,260,904 | Horton | Oct. 28, 1941 |
| 2,323,470 | Horton | July 6, 1943 |
| 2,339,407 | Horton | Jan. 18, 1944 |
| 2,348,346 | Horton | May 9, 1944 |